F. DOMENECH.
Making Sugar.
No. 26,573.
Patented Dec. 27, 1859.
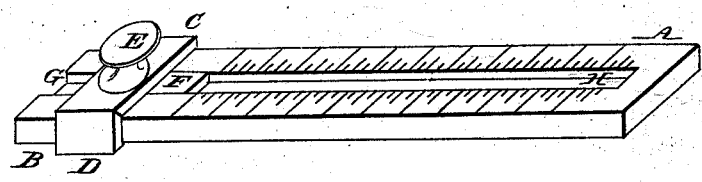
Witnesses:
Inventor:
Francisco Domenech

UNITED STATES PATENT OFFICE.

FRANCISCO DOMENECH, OF SPAIN.

IMPROVEMENT IN CLARIFYING CANE-JUICE.

Specification forming part of Letters Patent No. 26,573, dated December 27, 1859.

*To all whom it may concern:*

Be it known that I, FRANCISCO DOMENECH, of Ponce, in the Island of Porto Rico, have invented a new and Improved Method of Defecating Cane Juice or Sirup in the Manufacture of Sugar, of which the following is a full, clear, and exact description, reference being had to the accompanying drawing, which makes part of this specification, and which represents in perspective a view of an improved instrument used by me for this purpose.

My invention consists in a method of determining with accuracy the quantity of lime necessary to be added to the raw juice or sirup as it comes from the mill, to defecate or purify the same. This object I accomplish in the following manner: For measuring the lime, I provide an instrument formed of brass or other metal, A B, say four and a half inches long by half an inch wide. In the middle of its surface, and throughout its whole length, there is a small canal, G H, which is divided into thirteen degrees, which are subdivided into halves and quarters. There is a sliding plate or ring, C D, which runs along the plate A B. A set-screw, E, is fitted into the upper part of this sliding plate or ring, which screw is adapted to and serves to regulate the small piece of metal F, which covers part of the hollow of the canal, and by means of which are indicated the different degrees of the cavity of said canal as may be required in the operation. This is shown by running it backward and forward. The quantity of finely-powdered quicklime which fills one degree of the cavity when employed in the vessel used for the experiment (as hereinafter described) is equivalent to two ounces for the quantity to be operated upon. Half a degree is equivalent to one ounce, and one-quarter of a degree to half an ounce for the quantity designed to be clarified.

The instrument above described is to be used in connection with a vessel such as is commonly used by druggists—that is, graduated according to the specific gravity of water. The relations between the two are as follows: The volume of the liquid contained in the vessel up to half an ounce is equivalent to twenty-five gallons of the juice or sirup to be operated upon. The volume contained in one ounce is equivalent to fifty gallons, the contents of one ounce and a half to seventy-five gallons, and of two ounces to one hundred gallons, and so on, in the proportion of two ounces to every hundred gallons of the liquid to be subjected to the operation. Thus, in order to obtain the amount of quicklime required by a quantity of liquid of three hundred gallons, I pour into the graduated vessel a quantity of liquid which will fill it up to the mark indicating six ounces. For a quantity of three hundred and fifty gallons I fill it to seven ounces, for four hundred gallons eight ounces, and for four hundred and fifty gallons nine ounces, as indicated by the vessel in question.

Having thus placed in the vessel a quantity of the liquid proportioned to the amount to be operated upon, (as above explained,) the graduated instrument (which I call a "calometer") is brought into use as follows: I close the hollow or canal G H so as to mark one degree, and fix it by means of the set-screw E, so as to make the sliding plate C D stationary. This cavity of one degree I then fill with fine lime, taking care to fill it exactly without pressing it. This may be done by passing the blade of a knife or anything similar over the quantity thus placed in the canal. The lime thus measured I throw into the juice contained in the graduated glass or vessel, and mix the two thoroughly by stirring until the lime is thoroughly dissolved and combined with the juice, adding as many degrees of lime as may be necessary to make the liquid in the vessel present the appearance necessary to indicate that there has been a separation of all the matters foreign to the sugar, which were previously in suspension or dissolved in the juice. (I shall presently explain how this separation is manifested.) This separation having been effected and an account having been kept of the degrees of lime employed in the vessel, and it being already known that each one of these degrees is equivalent to two ounces, it is easy to determine the quantity to be employed in the whole quantity of juice to be operated upon. Thus, if one single degree of lime has been necessary to give the liquid in the graduated vessel the required appearance, there need be thrown into the juice to be operated upon no more than two ounces; if one degree and a quarter, two ounces and a half; if one and a half, three ounces; if one and three-quarters, three ounces and a half; and if two degrees four ounces, and so on in proportion. Whatever may be the number of degrees employed in the experiment on the liquid in the vessel, an equivalent of two ounces for every degree must be employed upon the whole quantity of juice to be defecated.

In order to determine with accucacy when the juice in the graduated vessel has a sufficient quantity of lime it will be observed that as soon as this latter substance becomes thoroughly incorporated with the juice the color of the latter is modified and instantly takes a greenish-yellow tint. It then presents the complete coagulation of all the substances foreign to the sugar, (which substances were in suspension in the liquid,) so that the surface of the juice becomes quite transparent. At this stage, after some two minutes or a little over, the particles begin to descend slowly and gradually, and while in suspension form a mass which has the appearance of a submerged sponge of moderate compactness, the interstices between the particles being, like the surface of the juice, transparent. When the foreign substances are thus separated, and as they are being precipitated to the bottom, the purified surface of the liquid is transparent and has the appearance of Maderia wine. These results having been obtained in the first experiment its accuracy and correctness may be easily verified. Empty the vessel of all the liquid already operated upon, pour into it an equal quantity of juice of the same temperature, (cold,) and throw into it at once the same quantity of lime as was required in the first experiment. Upon this being done, and the two substances mixed by stirring, there appears the transformation of color to greenish yellow, together with the other signs of coagulation, as above explained, accompanied by the same resemblance to a sponge.

It is necessary to observe that the liquid with which the experiment is made shall be cold, as it is well known that the phenomena produced by the action of the lime upon the juice while cold are different from those produced when the juice is under the influence of heat. Care should also be taken that the lime used in the first experiment be of the same quality as that employed in the subsequent operation, because if of a different character of stone it would be of different alkaline power. The harder the stone from which the lime is made the better is it adapted to the purpose of the operation above described.

What I claim as my invention, and desire to secure by Letters Patent, is—

The method of determining the amount of lime necessary to be added to the raw juice to defecate the same by the employment of the volumetric method, as herein set forth.

FRANCISCO DOMENECH.

In presence of—
 F. R. CONDERT,
 L. LEONCE CONDERT.